United States Patent Office 2,729,628
Patented Jan. 3, 1956

2,729,628

ACYLATED PROTEINS

Godfrey E. Mann, New Orleans, La., assignor to the United States of America as represented by the Secretary of Agriculture No Drawing. Application October 31, 1952,
Serial No. 318,141

3 Claims. (Cl. 260—123.5)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to chemically modified long chain polypeptides, such as proteins, having an unusually high intrinsic viscosity.

A particularly important use of long chain polypeptides is in the production of synthetic textile fibers. In such a use polypeptides in which the molecules tend to be oriented into long chains which tend to remain in a relatively extended position are particularly valuable and are characterized by a high intrinsic viscosity. A primary object of the present invention is to provide polypeptides having an unusually high intrinsic viscosity which are capable of being produced by subjecting low viscosity polypeptides to a chemical modification orienting the molecules into long chains which tend to remain in a relatively extended position.

We have discovered that when long chain polypeptides, particularly natural proteins such as peanut protein, soybean protein, casein, egg albumin, and blood albumin, are reacted with terephthalyl dichloride under reaction conditions causing the two halogen atoms of the terephthalyl dichloride to split out in the course of the reaction, the chemical composition of the polypeptide is altered by the attachment of non-halide portions of the terephthalyl dichloride in such a way that the product has a markedly greater intrinsic viscosity than that of the polypeptide starting material and the product, upon hydrolytic break-down, yields nitrogen free products in addition to amino acids.

In general, according to the invention, a process is provided for at least doubling the intrinsic viscosity of a long chain polypeptide, particularly a natural protein such as peanut protein, soybean protein, casein, egg albumin, and blood albumin by acylating the protein with terephthalyl dichloride under the conditions of the Schotten-Baumann procedure at a temperature from about 0° to 30° C.

In the preferred aspect of this process, the natural protein is peptized in a basic aqueous medium to form an aqueous solution containing from about 0.1 to 0.2 part by weight of protein. The peptized protein is then reacted with from about 0.04 to 0.12 part by weight, based on the weight of protein, of terephthalyl dichloride by mixing the peptized protein with a solution of the terephthalyl dichloride in enough diethyl ether so that the ether solution constitutes from about 29 to 39% of the resulting mixture, while maintaining the reaction temperature between about 0° to 5° C. and maintaining the pH of the reaction mixture to at least above 7. The reaction is continued until the intrinsic viscosity of the resulting modified protein is at least twice that of the natural protein, and the product may thereafter be isolated, as by conventional methods.

The acylation reaction appears to proceed substantially the same extent (as indicated by the amount of non-polypeptide material combined in the polypeptide product) when conducted at temperatures ranging from about 0 to 30° C. However, using the same reactants, reactions conducted at the lower temperatures, e. g., 0° to 5° C., appear to produce proteinaceous products of higher intrinsic viscosity than those produced by reactions conducted at the higher temperatures.

Examples of inorganic bases which can be used in peptizing the polypeptide in an aqueous solution include the alkali metal hydroxides, the alkaline earth metal hydroxides, the quaternary ammonium hydroxides, pyridine, and the like. The alkali metal hydroxides are particularly suitable. The use of an alkali metal hydroxide in conjunction with a water soluble inorganic basic buffer, such as sodium carbonate, to form a peptized protein solution which will remain basic throughout the course of the acylation reaction is preferred.

The aqueous solutions of peptized polypeptides can contain from about 0.05 part by weight of polypeptide to sufficient polypeptide to saturate the solution at the temperature employed. A polypeptide concentration of from about 0.1 to 0.2 part by weight is preferred.

Examples of non-reactive mutually soluble organic liquids with which the acylating agent can be mixed include the liquid hydrocarbons, ethers, and the like inert organic liquids, diethyl ether being preferred. The amount of organic liquid can be varied widely. However, the use of sufficient organic liquid to form, when the solution of the acylating agent and the liquid organic compound is mixed with the peptized polypeptide solution, an organic phase constituting from about 29 to 39 percent of heterogeneous reaction medium so produced, provides a unique and unobvious advantage in the process of the present invention. Although the reaction medium becomes more dilute as the amount of said organic liquid is increased, unobviously, when less than the above indicated amount is used, the rate of reaction is markedly reduced.

The crude polypeptide products produced by the present invention can be isolated by precipitating the polypeptide materials from the liquid reaction mixtures by conventional methods. For example, such products are produced by lowering the pH of the mediums, mechanically separating the products and washing them with water. Such products are useful, per se, in the textile fiber spinning process and the like. Purer products can readily be produced by numerous conventional procedures for purifying proteinaceous materials. A particularly suitable purification procedure comprises dialyzing the reaction medium, freezing it on the walls of suitable vessels, and subjecting the frozen material to a vacuum of 0.500 to 0.030 millimeter of mercury, so as to cause the water to leave the frozen mixture by sublimation.

The following examples are illustrative of the invention:

*Example 1*

A 20.0 gram portion of commercial peanut protein was stirred vigorously with 100 grams of water and the pH value at 26° C. was raised to 9.5 by dropwise addition of 1 normal sodium hydroxide. Two drops of 2-ethyl-1-hexanol were added to minimize foaming, and the turbid alkaline mixture was diluted to a total weight of about 200 grams by the addition of water. This solution, now containing 10 parts per hundred by weight of the polypeptide, was stirred with a "slotted-disc"-type of propeller, 1.75 inch in diameter, operated at 630 R. P. M.

To this stirred solution, maintained at 26° C., was added a solution of 1.600 grams of terephthalyl-dichloride in 60 ml. of diethyl ether. The addition was made in six 10 ml. portions, at 2-minute intervals. To ensure quantitative transfer of reagent an additional 20 ml. of other was used to rinse the various containers, and was added to the reaction mixture. The total volume of ether present in the mixture was 80 ml. The ether-terephthalyl-dichloride solution thus constituted about 29 volume percent of the mixture.

Acid liberation started at once. The 9.5 pH value of the mixture was maintained by the dropwise addition of 1 normal sodium hydroxide. After a 5-hour reaction period the acid liberation ceased. The pH of the reaction mixture was then elevated to the value of about 11 by further addition of 1 normal sodium hydroxide.

The reaction mixture was then transferred to a cellulose sausage casing and dialyzed for six days against running distilled water at about 6° C. The dialyzed mixture was then frozen on the walls of two liter round bottom flasks and dried by subjecting to a vacuum of about 0.05 millimeter of mercury.

A yield of 20.1 grams of a proteinaceous material was obtained. This material contained 15.71% nitrogen and 4.7% terephthalic acid (both values on moisture-free basis). The intrinsic viscosity of this material (10 molar urea as a solvent) was 0.72 deciliter per gram. The peanut protein used as a starting material had an intrinsic viscosity of 0.24 deciliter per gram.

*Example 2*

Example 1 was repeated, except that the 1.600 grams of terephthalyl-dichloride was dissolved in 100 ml. of diethyl ether and this solution was added to the stirred protein solution in five 20 ml. portions at 2-minute intervals. As in Example 1, 20 ml. of ether was employed as a rinse, making a total of 120 ml. of ether, or about 39 volume percent, in the reaction mixture.

A yield of 20.6 grams of proteinaceous material was obtained. This material contained 15.47% nitrogen and 4.5% terephthalic acid. The intrinsic viscosity (10 molar urea solvent) was 0.78 deciliter per gram.

*Example 3*

Example 1 was repeated except that the temperature of the protein solution was lowered to 6° C. before the diethyl ether solution of the terephthalyl-dichloride was added, and the temperature of the reacting mixture was maintained at 6° C. throughout the whole reaction period of 5 hours.

A yield of 19.7 grams of proteinaceous material was obtained. This material contained 15.68% nitrogen and 5.1% terephthalic acid, and its intrinsic viscosity in 10 molar urea was 1.04 deciliters per gram.

*Example 4*

Example 1 was repeated except that the temperature of the protein solution was lowered to about 0° C. before the diethyl ether solution of the terephthalyl-dichloride was added and the temperature of the reacting mixture was maintained at about 0° C. throughout the whole reaction period of 5 hours. A yield of 20.2 grams of proteinaceous material obtained. This material had a nitrogen content of 15.38% and a terephthalic acid content of 5.2% and its intrinsic viscosity in 10 molar urea was 1.64 deciliters per gram.

*Example 5*

One fourth of the reaction mixture produced by the procedure of Example 4 was dialyzed against running distilled water and dried from the frozen state as described in Example 4. The material so obtained weighed 5.2 grams and had an intrinsic viscosity of 0.65 deciliter per gram in 10 molar urea.

The remaining three fourths of the reaction mixture was acidified by dropwise addition of 1 normal hydrochloric acid until the pH value had dropped to 4.5. The resultant proteinaceous curdy precipitate was separated from the mother liquor by centrifugation and the clear supernatant liquid was discarded. The curd was washed by resuspending it in 300 ml. of water to which 4 drops of 1 normal hydrochloric acid had been added. The suspension so produced was centrifuged and the clear supernatant discarded. The curd was washed two more times using 300 ml. of water and employing the centrifuge as above.

One half of the moist curd was dried for about 3.5 hours in a circulating oven at about 50° C. The resulting buff-colored powder weighed 6.7 grams and had an intrinsic viscosity of 0.64 deciliter per gram in 10 molar urea solvent.

The remaining half of the moist, washed curd was vacuum-dried from the frozen state as previously described. 7.13 grams of dry powder was obtained; it had an intrinsic viscosity of 0.76 deciliter per gram in 10 molar urea solvent.

The intrinsic viscosity of the initial protein was 0.24 deciliter per gram in 10 molar urea.

*Examples 6, 7, 8, 9*

Acylated long chain polypeptides were prepared by the procedure of Example 1, using the indicated amounts of terephthalyl-dichloride and a reaction temperature of 0° C. 80 mls. of ether was used as an acylating agent solvent in each case.

The properties of the four proteinaceous products obtained are given in the following table:

| Example No. | Tereph.-dichloride used (grams) | Data on products ||||
|---|---|---|---|---|---|
| | | Yield (grams) | Nitrogen content (Percent) | Tereph. acid content (Percent) | Intrinsic viscosity (dl./g.) |
| 6 | 0.800 | 19.3 | 15.93 | 2.8 | 0.71 |
| 7 | 1.200 | 20.8 | 15.53 | 3.9 | 1.49 |
| 8 | 2.000 | 19.9 | 15.24 | 5.7 | 0.93 |
| 9 | 2.400 | 20.5 | 15.23 | 6.3 | 1.06 |

*Example 10*

Example 1 was repeated, using a peanut protein prepared on a laboratory scale by the use of ion-exchange fabrics (C. L. Hoffpauir and J. D. Gutherie, J. Biol. Chem. 178, 207 (1949)) and a reaction temperature of 0° C.

19.9 grams of proteinaceous material was obtained. This material had a nitrogen content of 15.89% and a terephthalic acid content of 3.5%; its intrinsic viscosity in 10 molar urea was 2.45 deciliters per gram as compared with the value of 0.2 deciliter per gram for the original protein.

We claim:

1. A process of at least doubling the intrinsic viscosity of a natural protein selected from the group consisting of peanut protein, soybean protein, casein, egg albumin, and blood albumin, comprising peptizing the natural protein in a basic aqueous medium to form an aqueous solution containing from about 0.1 to 0.2 part by weight of protein, reacting the peptized protein with from about 0.04 to 0.12 part by weight based on the weight of protein of terephthalyl dichloride by mixing the peptized protein with a solution of the terephthalyl dichloride in enough diethyl ether so that the ether solution constitutes from about 29 to 39% of the resulting mixture, while maintaining the reaction temperature between about 0 to 5° C. and maintaining the pH of the reaction mixture to at least above 7, and continuing the reaction until the intrinsic viscosity of the resulting modified protein is at least twice that of the natural protein.

2. The process of claim 1 wherein the natural protein is peanut protein.

3. A terephthalylated peanut protein produced by the process of claim 2 and having an intrinsic viscosity of at least 0.5 deciliter per gram.

References Cited in the file of this patent

UNITED STATES PATENTS 2,525,792     Gordon et al. _____ Oct. 17, 1950

FOREIGN PATENTS 649,548     Great Britain _____ Jan. 31, 1951

OTHER REFERENCES

Gordon, Brown and Jackson: Ind. and Eng. Chem., vol. 38, No. 12, December 1946, pp. 1239–42.

Olcott et al.: Chem. Reviews, vol. 41, No. 1, August 1947, pp. 180, 186, 188.